March 13, 1934.  A. L. RAWLINGS  1,950,517
GYROSCOPIC BASE LINE
Filed Aug. 21, 1929  2 Sheets-Sheet 1

INVENTOR
ARTHUR L. RAWLINGS
BY Herbert H. Thompson
his ATTORNEY.

March 13, 1934.    A. L. RAWLINGS    1,950,517
GYROSCOPIC BASE LINE
Filed Aug. 21, 1929    2 Sheets-Sheet 2
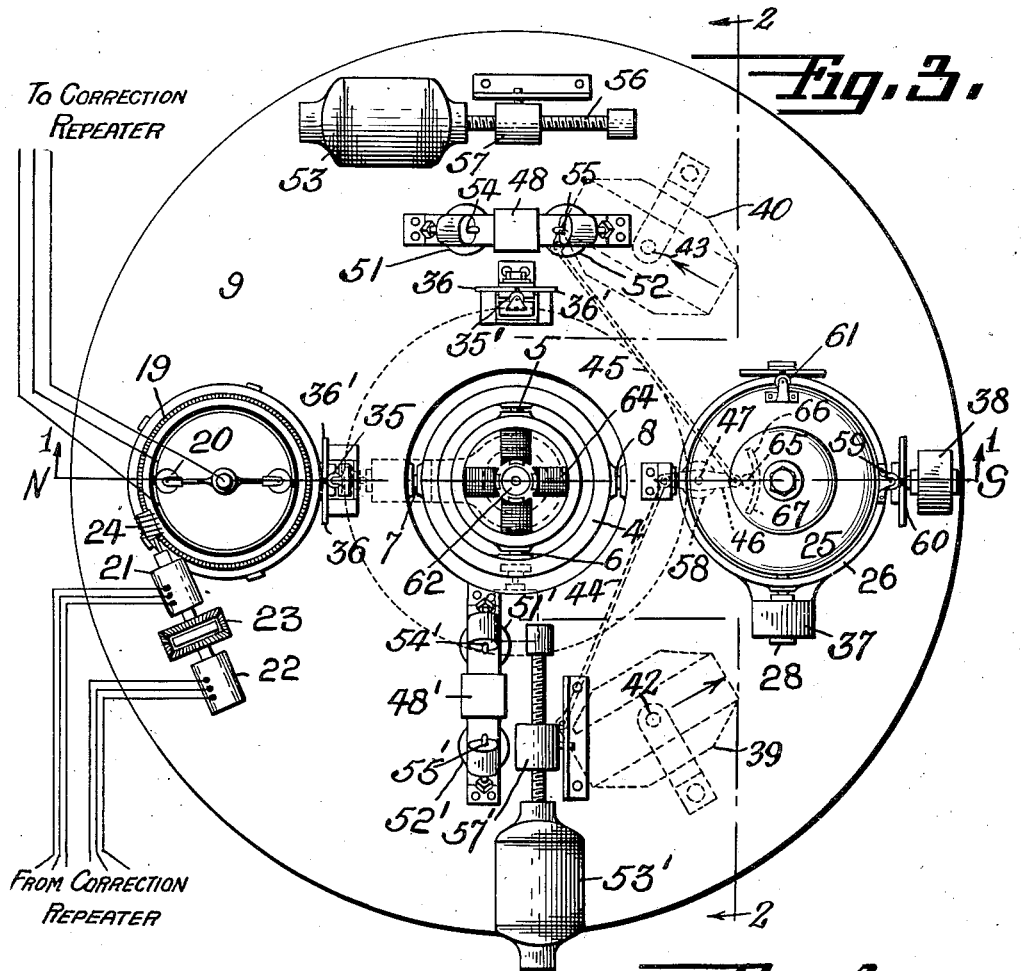
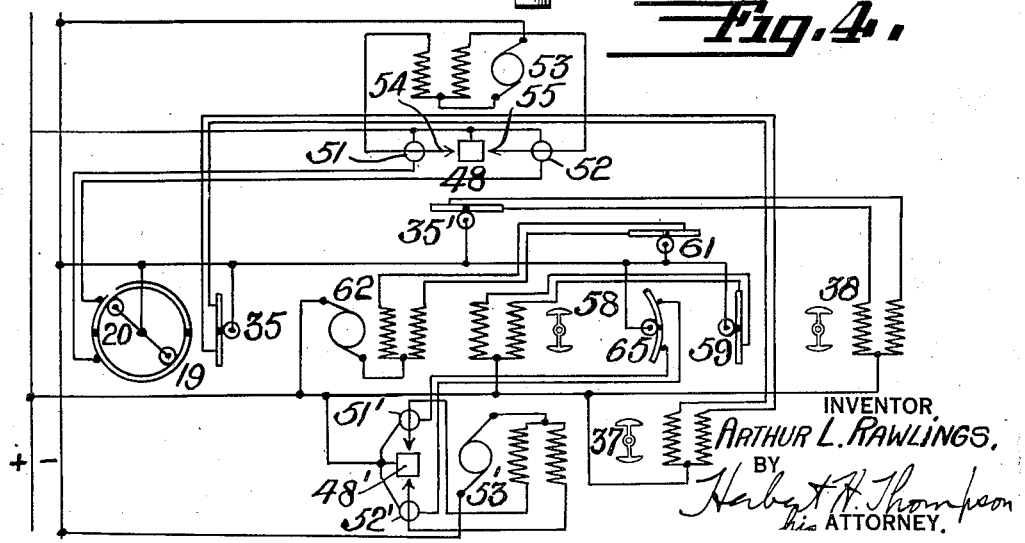
INVENTOR
ARTHUR L. RAWLINGS.
BY Herbert H. Thompson
his ATTORNEY.

Patented Mar. 13, 1934

1,950,517

UNITED STATES PATENT OFFICE 1,950,517

GYROSCOPIC BASE LINE

Arthur L. Rawlings, London, England, assignor to Sperry Gyroscope Company, Inc., Brooklyn, N. Y., a corporation of New York Application August 21, 1929, Serial No. 387,280 In Great Britain August 9, 1929

24 Claims. (Cl. 33—226)

This invention relates to stabilized base lines or planes, especially adapted for use as an artificial horizon and azimuth indicator for fire control purposes on ships. I prefer to incorporate in one instrument both the artificial horizon and the gyroscopic compass, the two elements cooperating to produce an instrument of greater precision than either instrument would have alone. At the present time dependence is still had upon the real horizon for securing both the direct and cross levels, but owing to the increasing use of smoke screens it is not always possible to secure such levels and an artificial horizon then becomes a fundamental necessity. The horizontal must be maintained accurately within very few minutes of arc, since five minutes change in elevation makes a difference of 100 yards in range for normal ranges. Furthermore, it is desirable to have the baseline stabilized with sufficient stiffness so as to actuate transmitters of position directly therefrom.

My apparatus consists in the main of a horizontal platform supported at its center on a universal joint, preferably a ball bearing supporting gimbal rings, so that the platform is free to turn in azimuth and to oscillate about both horizontal axes. The platform preferably carries, first, a gyroscopic compass or other azimuth gyroscope by which the platform is maintained in a fixed position in azimuth, and second, a stabilizing gyroscope which assists in maintaining the platform level about both horizontal axes. Preferably neither said compass nor stabilizing gyroscope, however, operate directly on the platform, but I prefer to provide in addition a third gyroscope or preferably a pair of gyroscopes of special construction which are employed in connection with the main gyroscopes as servo devices to carry out, as it were, the orders received from the two main gyroscopes.

The entire platform is preferably balanced neutrally about its pivot, its inertia tending to resist any disturbance, so that if it were set level with a marked radius pointing north, only the friction of the joint would prevent it from being a gyroscopic compass and artificial horizon without further complication. The gyroscopic and other apparatus described, however, is employed to not only prevent the deviations caused by friction but also those caused by errors in balance or changes of balance of the platform. The manner in which this is accomplished will become apparent from the following description.

Referring to the drawings in which the preferred form of the invention is shown;

Fig. 3 is a plan view of the device.

Fig. 4 is a wiring diagram.

Figure 1:
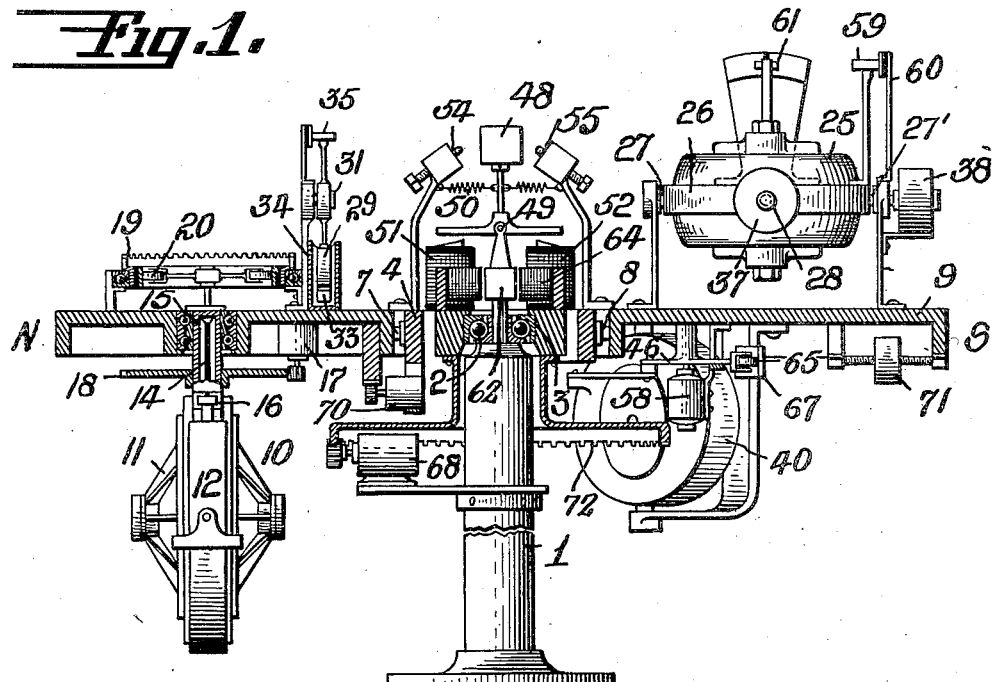
Fig. 1 is a sectional elevation of my artificial horizon looking toward the east, the section being taken on broken line 1—1 of Fig. 3 looking in the direction of the arrows.
Figure 2:
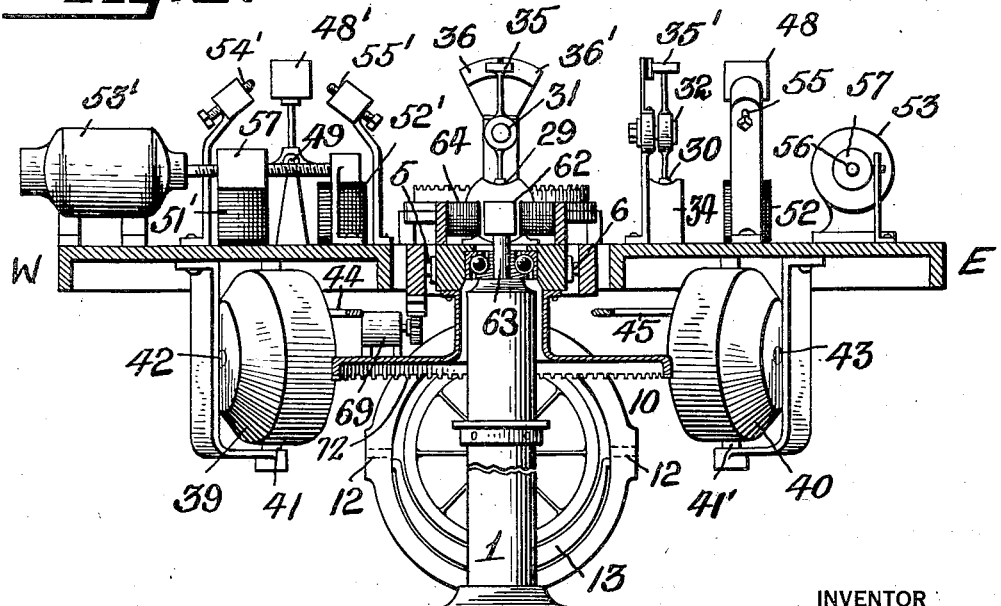
Fig. 2 is a section elevation of the same looking north, the section being taken approximately on broken line 2—2 in Fig. 3, looking in the direction of the arrows, but the two slave gyroscopes being shown for sake of clearness as if moved to the north of their actual position.

The entire device is preferably supported on the post 1 by some form of universal pivot. As shown there is a ball bearing 2 provided at the top of the post on the outer race 3 of which is pivoted a gimbal ring 4 on pivots 5—6. Said ring in turn carries on pivots 7—8 at right angles to the pivots 5—6 the main platform 9 on which is mounted the stabilizing apparatus. The gyroscopic compass element 10 may be of simple form, since the platform is otherwise stabilized and is shown as comprising the usual gyro case 11 pivoted on horizontal trunnions 12—12. Gravitational control may be provided in any suitable manner as by bail 13 (see Sperry Patent No. 1,279,471). The sensitive element is shown as suspended by wires 14 from the follow-up element 15, the latter being driven in the usual manner from the follow-up contacts 16 actuating the azimuth motor 17 geared to the follow-up frame 18. A correction for speed and latitude preferably imparts a slight adjustment to a split ring 19 adjustably mounted on the platform 9 above the compass. This said ring contacts with the trolleys or brushes 20 on the sensitive element of the compass so that the platform has no speed or latitude error. This may be accomplished by means of a correction repeater compass such as referred to in Sperry Patent No. 1,403,062 (Fig. 1). Said repeater compass is actuated from the transmitter 68 hereinafter described, computes the corrected reading, and transmits both the corrected and uncorrected readings to repeater motors 21 and 22 (Fig. 3) on platform 9. The differential of the movements of said motors is transmitted through differential gearing 23 to worm 24 which rotates the ring 19 just enough to introduce the correction. A suitable power actuated mechanism hereinafter described is controlled from said contacts on ring 19 and brush 20 to maintain the platform fixed in azimuth with no course and speed error.

For controlling the stability of the platform in a horizontal plane, I may employ a second gyroscope 25 or gyro-vertical pivoted within gimbal ring 26 for oscillation about N—S horizontal axis 27, 27' and E—W horizontal axis 28 on the platform. Said gyroscope is preferably mounted in neutral equilibrium, but in order to prevent the same from straying and to maintain it vertical, notwithstanding the earth's rotation, I provide a controlling means therefor which may be in the form of auxiliary pendulums 29—30, the former being mounted on the platform for oscillation about the north-south axis 31 and the latter being mounted on the platform for oscillation about east-west axis 32. Each pendulum may be heavily damped by having a blade thereon 33 dipping in liquid within a tank 34. Each pendulum is shown as carrying a contact 35—35' bearing on fixed contacts 36—36', said contacts controlling torque-applying devices on the gyroscope. The contact 35 on the pendulum 31 controls the torque motor 37 on the horizontal axis 28 of the gyroscope, while contact 35' on the pendulum 30 controls a motor 38 on the axis 27 of the gyroscope. Said pendulums act as restoring devices on the gyroscope so that the gyroscope is maintained vertical. The torque exerted by the motor is adjusted so that it causes a very slow precession of the gyroscope, say about 2' per minute. As the gyroscope levels up the platform will also become level and centralize the trolley 20 on its contactor. Rolling of the ship will not cause disturbance of the gyroscope, because although the pendulums may oscillate slightly they will swing equally to each side of their central position and no persistent torque will result on the gyroscope.

For controlling the platform from the two master gyroscopes, I prefer not to use direct operating torque-applying devices or servo motors but prefer to use instead one or more auxiliary gyroscopes, the precession of which causes directly or indirectly the desired movements of the platform. I have shown two gyroscopes 39—40 for this purpose, which are preferably mounted on the platform on normally vertical pivots 41—41' for spinning about normally horizontal axes 42 and 43, said axes being normally placed a substantial angle apart, each at an equal angle to the meridian. Said gyroscopes are coupled for equal and opposite precession about their vertical axes as by means of a pair of links 44—45 connected at their inner ends to opposite ends of the lever or arm 46 pivoted at its center 47 to the platform 9. It will therefore be seen that the gyroscopes can only turn together in azimuth by taking the entire platform with them, but on the other hand they are free to turn or precess oppositely in azimuth without moving the platform. Thus a weight put on the north end of the platform, for instance, will cause both gyros to turn the platform to the west, assuming the top of the gyro rotors to be rotating in a direction indicated by the arrows in Fig. 3, that is, in a clockwise direction viewed from the south, while a weight put on the south end of the platform will cause opposite precession of the gyroscopes and result in movement of the platform toward the east. Hence, to make the platform follow the compass I provide means for causing relative displacement of the platform and compass to shift the center of gravity of the platform in a north-south direction as by shifting a weight thereon in such plane. The auxiliary gyroscopes 39—40 become, therefore, in effect, servo motor or slave gyroscopes and the rate of precession is adjusted so that the platform is only moved about one degree per minute.

As shown, the weight-shifting device is in the form of a mass 48—48' pivoted at 49 and normally maintained in a central vertical position by springs 50. When, however, one or the other of electro-magnets 51—52 are excited from contacts 19 and 20, the weight 48 is thrown to the right or left of the east-west diameter of the platform, thus causing resultant precession of the servo motor gyroscopes. I also prefer to provide an additional weight-shifting device in connection therewith. Said device is shown as in the form of a motor 53 (Figs. 3 and 4) in circuit with reversing contacts 54—55 which are completed when the weight is thrown to the right or left. Said motor operates a screw shaft 56 on which a mass 57 is threaded so that as the motor rotates the mass is advanced to the north or south.

The action of this weight-shifting device is as follows: Suppose that the weight 48 is more than sufficient to correct for a small out-of-balance of the platform causing deviation from the meridian. When the weight goes over it starts precession of the auxiliary gyroscopes bringing the trolley 20 back to the same position when the weight 48 will again be centralized by the springs. While it was over a short time the motor 53 ran the weight 57 a small distance so as to approximately correct for the permanent out-of-balance which caused the original disturbance. On the other hand, if the weight 48 is not sufficient to correct the out-of-balance or other disturbing factor, the weight will go over against one of stops 54 or 55 and stay there until the motor 53 has traversed the weight 57 sufficiently to bring the trolley 20 back to zero. Eventually, in any case, the weight operated from the motor will find a steady position where it corrects the out-of-balance of the platform.

The same gyroscopes are preferably utilized in connection with the control of the tilt of the platform in both directions. By following the gyroscopic reactions of the said auxiliary gyroscopes, it will be seen that as they both appear to rotate clockwise, as seen from the south, a couple applied to both around the vertical in the same direction, that is, a couple tending to turn the platform as a whole in azimuth, will make the gyroscopes precess so as to tilt the platform up or down about the east-west axis, that is, to tilt the north side, for instance, of the platform up or down, but no tilting will take place about the N—S axis. On the other hand, when the gyros are viewed from east or west, the gyroscopes rotate in opposite directions. Hence, if a couple is applied around the vertical axes of the two gyroscopes in opposite directions, they will both tilt in the same direction taking the platform with them, but in this case the tilt will be about a north-south axis, or in other words, so that the west side of the platform, for instance, moves up or down but no tilting takes place of the north side of the platform.

To utilize these phenomena I connect a reversible torque motor 58 to the cross link 46 so as to apply a torque through the links 44—45 to gyroscopes in opposite directions, which motor I control by a contact 59 on the vertical gyroscope, which may operate between gimbal 26 and a fixed arm 60 on the platform. As the platform tilts to the east or west, therefore, the torque motor 58 will cause an opposite torque to be applied about the vertical axis of the servo motor gyroscopes 39—40 and thus bring the platform back to level position.

On the other hand, I control, from the trolley 61 operating upon tilt of the platform with respect to the vertical gyroscope about the east-west axis, a torque-applying motor 62 which exerts a torque about the main vertical axis of the platform. Said motor is shown as having the armature thereof connected to a fixed stem 63 rising from the base pillar 1, while the fields 64 are secured to an annular extension of the outer race of the ball bearing 2. Therefore, if the north end of the platform tilts down, for instance, the motor 62 is brought into play to exert a torque around the vertical axis of the platform causing the straightening up of the platform through the precession of the slave gyroscopes 39—40. It is obvious that other types of torque-applying devices may be employed instead of electric motors.

There is still another source of error that I correct by my invention, namely, out-of-balance of the platform about the north-south axis. Suppose, for instance, that the platform becomes heavy on the east side. This will cause the two slave gyros to precess oppositely but will not turn the platform in azimuth. Accordingly I mount a contact 65 on the lever 46 connecting the links 44 and 45 which bear on fixed contacts 66—67 and I control from said contacts a device adapted to displace the weight 48' for shifting the center of gravity in the east-west direction, which may be similar in all respects to the weight 48 which is displaced in the north-south direction by contact 19 on the azimuth gyroscope, corresponding parts 51' and 52' being given corresponding primed numerals. Said weight may be supplmented by a similar motor 53' and weight 57' as in the other case. My platform is thus controlled in all its adjustments and movements from master gyroscopes acting through the servo motor system which includes one or more slave gyroscopes, my system being such that the platform is substantially self-balancing and will, therefore, not get out of balance due to changes in temperature or adjustment of the various parts.

Suppose, for instance, that the platform becomes heavy on the north side. The first effect will be a precession of the slave gyroscopes toward the west taking the platform with them. As soon as this happens, however, contact is made between the trolleys and contact 19 on the gyro compass which shifts the weights 48 and 57 in the proper direction to restore the balance and stop the precession as explained above.

Now suppose the platform becomes heavy on the east side. This will cause the two slave gyros to precess oppositely, but the platform will not turn in azimuth. Trolley 65, on the other hand, will be displaced causing the shift of weights 48' and 57' which restores the balance in the east-west direction. My invention, therefore, enables me to completely overcome couples tending to displace it in azimuth, such as frictional couples which are caused by turning of the ship and it effects this purpose by developing definite opposing couples brought into action by supplemental sources of power controlled by the precession of the slave gyroscopes. The slave gyroscopes are able, by the gyroscopic reaction, to take care of small couples without assistance, but when a disturbing couple is applied, which is not counter-acted entirely by the slave gyroscopes, the aforesaid sources of energy are brought into action to exert counter-balancing forces and to prevent the platform from becoming displaced.

By having the platform thus rigidly stabilized, I may operate transmitters directly from the platform to transmit the relative tilt and azimuth of the ship with respect to the plaform to a distance. For this purpose I have shown transmitter 68 mounted on the post 1 and geared so as to be rotated by relative turning of the platform in azimuth as by being geared to the toothed ring 72 which forms an extension of the outer race of ball bearing 2. Said transmitter will transmit the azimuth readings of the platform just as the present gyro compass transmitter does. I also employ a transmitter 69 mounted on the face of ring 72 and operating therebetween and teeth on the underside of the gimbal ring 4 to transmit the relative tilt of the platform about axis 5—6, that is, about the east-west axis, and a third transmitter 70 mounted on said gimbal ring and actuated by the relative tilt of the platform with respect to the gimbal about the axis 7—8. At 71 I show a weight adjustable for latitude in the N—S direction, and which, when properly adjusted, relieves the system of a part of its self-balancing adjustments.

In accordance with the provisions of the patent statutes, I have herein described the principle and operation of my invention together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by letters patent is:

1. In a gyroscopic base line, a rotatable support, means for universally mounting the same, an azimuth gyroscope mounted thereon, a second gyroscope mounted on said support for freedom about one axis only with respect thereto besides its spinning axis, and means brought into action by turning of the support with respect to said azimuth gyroscope for causing a torque to be applied on said second gyroscope about said axis thereof, whereby the gyroscopic reaction of said second gyroscope causes said support to follow said azimuth gyroscope.

2. In a gyroscopic base line, a support, means for universally mounting the same, an azimuth gyroscope mounted thereon, a pair of gyroscopes mounted on said support for freedom about their vertical axes, means connecting said gyroscopes permitting only opposite precession, means brought into action by turning of the support with respect to said azimuth gyroscope for shifting the center of gravity of said support in the N—S direction, and means brought into action by opposite precession of said gyroscopes for shifting the center of gravity of said support in the E—W direction.

3. In a gyroscopic base line, a support, means for universally mounting the same, an azimuth gyro and a gyro-vertical mounted thereon, means brought into action by displacement of said support in azimuth with respect to the azimuth gyro for applying a torque about the E—W diameter of the support, and means brought into action by tilting of said support about its E—W axes with respect to said gyro vertical for applying a torque about the vertical axis of the support.

4. In a gyroscopic base line, a universally mounted support, a gyro-vertical mounted thereon, a slave gyroscope mounted thereon for freedom about one axis only with respect thereto in addition to its axis of spin, means brought into action by tilting of said support with respect to said gyro-vertical about one horizontal axis for applying a torque on said slave gyroscope, and means brought into action by tilting of said support about a horizontal axis at right angles to said first horizontal axis for applying a torque about the vertical axis of said support.

5. In a gyroscopic base line, a universally mounted support, a gyro-vertical mounted thereon, a pair of gyroscopes mounted on said support for freedom about their vertical axes, means connecting said gyroscopes permitting only opposite precession, means brought into action by tilting of said support with respect to said gyro vertical about one horizontal axis for applying opposite torques respectively about the vertical axes of said pair of gyroscopes, and means brought into action by tilting of said support about the other horizontal axis for applying a torque about the vertical axis of the support.

6. In a gyroscopic base line, a universally mounted support, an azimuth gyro and a gyro-vertical freely mounted thereon, a pair of slave gyros also mounted thereon, means coupling said slave gyros for opposite precession about their vertical axes, means for altering the balance of said support in response to relative movement of said support with respect to said azimuth gyro and in response to opposite precession of said slave gyros, means for turning said support in azimuth in response to relative tilting of said support with respect to said gyro vertical about one axis, and means for applying opposite torques respectively to said slave gyros about their vertical axes in response to tilting of said support about its other horizontal axis with respect to said gyro-vertical.

7. In a gyroscopic base line, a universally mounted support, an azimuth gyro and a gyro-vertical freely mounted thereon, a pair of slave gyros also mounted thereon, means coupling said slave gyros for opposite precession about their vertical axes, means for altering the balance of said support about the E—W axis in response to relative movement of said support with respect to said azimuth gyro and about the N—S axis in response to opposite precession of said slave gyros, means tending to turn said support in azimuth in response to relative tilting of said support with respect to said gyro vertical about the E—W axis, and means for applying opposite torques respectively to said slave gyros about their vertical axes in response to tilting of said support about its N—S horizontal axis with respect to said gyro vertical.

8. In a gyroscopic base line, a support, means for universally mounting the same, an azimuth gyroscope mounted thereon, a pair of gyroscopes mounted on said support for freedom about their vertical axes and spinning about horizontal axes, means connecting said gyroscopes permitting only opposite precession and maintaining them at equal and opposite acute angles to the meridian, and means brought into action by turning of the support with respect to said azimuth gyroscope for shifting the center of gravity of said support in the N—S direction whereby like precession of said gyroscopes occurs carrying said support toward the meridian.

9. In an artificial horizon, a support, means for universally mounting the same, an azimuth gyroscope mounted thereon, a pair of gyroscopes mounted on said support for freedom about their vertical axes and with their spin axes horizontal and at opposite angles to the N—S direction, means connecting said gyroscopes for equal and opposite precession, and means brought into action by turning of the support with respect to said azimuth gyroscope for shifting the center of gravity of said support in the N—S direction.

10. In a gyroscopic compass, a support mounted for rotation in azimuth, a meridional gyroscope mounted thereon for freedom about its vertical axis, a second gyroscope also mounted thereon with two degrees of freedom with respect to said support, means brought into action by relative displacement of said support and meridional gyroscope for applying a torque on said second gyroscope to cause turning of said support, and means brought into action by relative displacement of said second gyroscope and the support for shifting the center of gravity of the support.

11. A gyroscopic base line instrument comprising a support, means for mounting the same for oscillation about a plurality of horizontal axes and for turning about a vertical axis, a plurality of gyroscopes mounted thereon, each having freedom about at least one axis with respect to said support, and a plurality of means for causing torques to be applied about the three principal axes of support, said means being brought into action by relative displacement between the support and the gyroscopes.

12. A gyroscopic base line instrument comprising a support, means for mounting the same for oscillation about a plurality of horizontal axes and for turning about a vertical axis, a plurality of gyroscopes mounted thereon, each having freedom about at least one axis with respect to said support, and a plurality of means for shifting the center of gravity of said support in both N—S and E—W directions and brought into action by relative displacement between the support and the gyroscopes about vertical and horizontal axes.

13. A gyroscopically stabilized platform, comprising a support, means for mounting the same for turning about a vertical axis and for oscillation about a plurality of horizontal axes, a pair of gyroscopes mounted on said support with their spin axles horizontal and at an angle to one another and with freedom about their vertical axes with respect to the platform but coupled together to have equal and opposite precession about these axes relatively to the platform, and means on the support automatically acting when the support is displaced angularly from its normal position about a vertical or any horizontal axis to apply couples to said gyroscopes causing precession to restore the support to its normal position.

14. In a gyroscopically stabilized platform, a universally mounted support, a gyro vertical thereon, a pair of servo-gyroscopes mounted thereon with their spin axles horizontal and with freedom about their vertical axes with respect to the platform but coupled together to have equal and opposite precession about these axes, means brought into action by tilting of said support with respect to said gyro vertical about one horizontal axis for applying couples in the same sense round the axis of support causing precession of said servo-gyroscopes to reduce the tilt of the said support, and means brought into action by tilting of said support about a horizontal axis at right angles to the first for applying couples in opposite senses about the vertical axes of the gyros causing precession of said gyroscopes to reduce the tilt of the support.

15. A gyro stabilized platform as claimed in claim 14 having a compass carried by the support, and means brought into action by relative motion between the platform and said compass to change the balance of the platform so as to cause precession of both gyros in the same direction and so restore the platform to the same azimuth as the compass.

16. In a gyroscopic base line, a support, means for universally mounting the same, an azimuth gyro, a slave gyro, and a stabilizing gyro mounted thereon, means brought into action by displacement of said support in azimuth with respect to the azimuth gyro for applying a torque about the E—W diameter of the support to cause said slave gyroscope to turn the support, and means brought into action by tilting of said support about its E—W axes with respect to said stabilizing gyro for applying a torque to said support about its vertical axis, causing said slave gyroscope to restore the support to its normal position about said E—W axis.

17. In a gyroscopic base line, a support, means for universally mounting the same, an azimuth gyro, a slave gyro, and a stabilizing gyro mounted thereon, means brought into action by displacement of said support in azimuth with respect to the azimuth gyro for applying a torque about the E—W diameter of the support to cause said slave gyroscope to turn the support, means brought into action by tilting of said support about its E—W axis with respect to said stabilizing gyro for applying a torque to said support about its vertical axis, causing said slave gyroscope to restore the support to its normal position about said E—W axis, and means brought into action by continued out-of-balance of said support about said E—W axis for causing a corrective shift in the center of gravity thereof through continued resulting displacement of the support in the same direction with respect to said azimuth gyro.

18. In a gyroscopic base line, a support, means for universally mounting the same, an azimuth gyro, a pair of slave gyros coupled for opposite precession and a gyro vertical mounted on said support, means brought into action by displacement of said support in azimuth with respect to the azimuth gyro for applying a torque about the E—W diameter of the support to cause the slave gyroscopes to turn the support, means brought into action by tilting of said support about its N—S axis with respect to said stabilizing gyro for applying opposite torques to the slave gyros to cause said slave gyroscopes to restore the support about said N—S axis, and means brought into action by continued out-of-balance of said support about said N—S axis causing displacement of said slave gyroscopes to cause a corrective shift in the center of gravity of said support.

19. In a gyro base line instrument, the combination with a universally mounted platform, of a system of slave gyroscopes mounted thereon, to cause corrective movements of the platform by precession, a shiftable mass also mounted thereon, means for temporarily shifting said mass to one side or the other of the platform for causing said precession, and means brought into action by successive shifting of the weight in the same direction for readjusting the center of gravity of the same to restore the balance.

20. A gyroscopically stabilized platform comprising a universally mounted support, a pair of gyroscopes mounted on said support with their spin axles horizontal and with freedom about their vertical axes with respect to said platform, means coupling the two gyroscopes of said pair for equal and opposite precession about said vertical axis relative to the platform, and means on the support automatically acting when the support is displaced from its normal position about any one of its vertical or horizontal axes to apply couples to said gyroscopes causing precession thereof to restore the support to its normal position.

21. In a gyroscopic base line, a universally mounted support, an azimuth indicator and an indicator of the vertical both mounted thereon, a pair of coupled gyroscopes also mounted thereon for opposite precession about their vertical axes, means for applying a torque to said support about one horizontal axis in response to movement of said support with respect to said azimuth indicator, means for applying a torque about a second horizontal axis normal to the first axis in response to opposite precession of said coupled gyros, means for applying a torque around the vertical axis in response to tilting of said support with respect to said vertical indicator about the first horizontal axis, and means for applying a torque to said coupled gyros oppositely about their two vertical axes in response to tilting of said support with respect to said vertical indicator about said second horizontal axis each of said torques causing said coupled gyroscopes to precess in a manner to correct the corresponding movement of the support.

22. In a gyroscopic base line, a universally mounted support, an azimuth indicator and an indicator of the vertical both mounted thereon, a pair of coupled gyros also mounted thereon for opposite precession about their vertical axes, means for applying a torque to said support about one horizontal axis about the E—W axis in response to relative movement of said support with respect to said azimuth indicator, means for altering the balance of said support about the N—S axis in response to opposite precession of said gyros, means for applying to said support a couple about a vertical axis in response to relative tilting of said support with respect to said vertical indicator about the E—W axis, and means for applying opposite torques to said coupled gyros about their vertical axes in response to tilting of said support with respect to said vertical indicator about its N—S axis whereby the resulting precession of said coupled gyroscopes corrects the error in the position of said support which would otherwise occur.

23. In a gyroscopic base line, a support, means for universally mounting the same, an azimuth gyroscope mounted thereon, a pair of gyroscopes mounted on said support for freedom about their vertical axes and with their spin axes normally horizontal at opposite angles to the N—S direction, means connecting said gyroscopes permitting only opposite precession with respect to said support, and means brought into action by turning of the support with respect to said azimuth gyroscope for shifting the center of gravity of said support in the N—S direction.

24. In a gyroscopic base line, a support, means for universally mounting the same, an azimuth gyroscope mounted thereon, a pair of gyroscopes mounted on said support for freedom about the vertical axis only with respect thereto and with their spinning axes horizontal and at an angle to one another, means for coupling said gyroscopes permitting opposite precession only, and means brought into action by turning of the support with respect to said azimuth gyroscope for causing a torque to be applied about a horizontal axis of said support at an angle to both of said spinning axes whereby said pair of gyroscopes, by precessing together, carry the support with them in azimuth.

ARTHUR L. RAWLINGS.